United States Patent [19]

Steiman

[11] 3,957,178

[45] May 18, 1976

[54] HAND-HELD DISPENSER PUMP CONSTRUCTION

[75] Inventor: Wolf Steiman, Bridgeport, Conn.

[73] Assignee: VCA Corporation, Greenwich, Conn.

[22] Filed: Sept. 26, 1974

[21] Appl. No.: 509,485

Related U.S. Application Data

[63] Continuation-in-part of Ser. No. 476,039, June 3, 1974.

[52] U.S. Cl. .............................................. 222/321

[51] Int. Cl.² ........................................ G01F 11/32

[58] Field of Search ..................... 222/320, 321, 383

[56] References Cited

UNITED STATES PATENTS

| | | | |
|---|---|---|---|
| 2,729,506 | 1/1956 | Ziherl et al. | 222/321 X |
| 3,229,864 | 1/1966 | Roder | 222/321 |
| 3,298,573 | 1/1967 | Smalley | 222/321 X |

*Primary Examiner*—Allen N. Knowles
*Assistant Examiner*—Hadd S. Lane
*Attorney, Agent, or Firm*—H. Gibner Lehmann; K. Gibner Lehmann; E. Donald Mays

[57] ABSTRACT

A small hand-held dispenser of the pump variety, comprising a container and a cooperable dispenser pump construction adapted to be carried by the container. The pump per se is secured therein by means of a unique plastic closure which is in the form of an inverted, dish-shaped member. The closure has relatively thin walls enabling it to be readily molded, and has a depending peripheral flange with an internal bead which is forced over an external shoulder on the rim of the container so as to effect a snap fit therewith. In one embodiment, the flange has a depending portion which extends downward a substantial distance beyond the location of the internal bead, so as to minimize the likelihood of the flange being cracked either during or after the forced bypass of the bead and container shoulder. The plastic closure not only securely mounts the pump assemblage, but also effects a leak-proof connection with the container while at the same time simplifying the assembly operations and tooling.

1 Claim, 7 Drawing Figures

HAND-HELD DISPENSER PUMP CONSTRUCTION

CROSS REFERENCE TO RELATED APPLICATION

The present application is a continuation-in-part of my copending U.S. application, Ser. No. 476,039, filed June 3, 1974, entitled "Hand-Held Dispenser Pump Construction," and having common ownership with the present application.

BACKGROUND

This invention relates to small hand-held dispensers involving pump assemblages, as distinguished from pressurized aerosol containers and valves. In the past there was proposed a press-fit closure assemblage for a pressurized aerosol container, as described and claimed in U.S. Pat. No. 2,957,611 issued to Philip H. Sagarin on Oct. 25, 1960. The plastic closure member disclosed therein was characterized by very thick walls whereby there was entailed a relatively long curing time and therefore a lengthy molding cycle. In cases where special reinforcement was mot utilized, previous efforts to reduce the required curing time by making the walls somewhat thinner frequently yielded unsatisfactory results in that there was a pronounced tendency for such closures to develop vertical cracks in the peripheral walls, as when the closures were forced onto or snapped over the rim of the container. Moreover, the tendency for the plastic material to shrink with aging meant the possibility of pressure leakage of the contents of the can during shipping or after a lengthy period of shelf storage.

To my knowledge no previous constructions have been proposed for economically assembling a pumping unit to an aerosol-type can of the kind capable of containing pressurized product, such as that normally sealed by a crimped closure as distinguished from screw threads. Nor were there any previous constructions for economically assembling pumping units to snap-closure type glass bottles. Instead, prior pump-type dispensers generally utilized threaded caps, and plastic or glass containers having cooperable threaded necks. These dispensers had the disadvantages of high cost of the screw threads as well as the relatively complex assembly machinery for attaching the screw caps and pumps to the threaded container necks.

SUMMARY

The above disadvantages and drawbacks of prior pump or snap-closure type dispensers are obviated by the present invention, which has for its main object the provision of an improved, pumptype dispenser wherein a quick and easy joining of the components is had without the likelihood of leakage occurring at a later time, either during storage and shipping or when in use. A related object of the invention is the provision of an improved pump-type dispenser as above set forth, which can be economically produced at a minimum cost with respect to components and assembly.

The above objects are accomplished in one embodiment by a novel snap-on type plastic closure member which is so constituted as to enable it to be assembled to a pump unit by a simple snap fit assembly, and thereafter assembled to an aerosol-type can by a second snap-on operation. The plastic closure member is in the form of an inverted, dish-shaped molding having a depending peripheral flange with undercuts or grooves in its inner walls. One undercut receives a flat, external mounting flange of the pump cylinder member with a snap fit, and another undercut receives the rounded or curled top rim of an aerosol-type can, also with a snap fit. No screw threads whatsoever are involved in the fabrication or assembly of the parts. The plastic cover overlies and fits around the curled rim of the aerosol can in such a manner that any shrinkage of the plastic will result in a tighter gripping and sealing of the closure whereby there is minimized the likelihood of leakage of product from the can and/or looseness of the pump assemblage.

In another embodiment, the flat external mounting flange of the pump assemblage is secured in place by means of a dish-shaped plastic closure member having a peripheral flange portion which is provided with an internal annular bead adapted to be forced past an external shoulder on the rim of a container such as a molded glass bottle. The peripheral flange has a depending, reinforcing portion which extends downward a substantial distance below the location of the internal bead. The arrangement is such that there is greatly minimized the tendency for the peripheral flange to develop vertical cracks, either during or after the bypass of the bead and the container shoulder.

Other features and advantages will hereinafter appear.

Figure 1:
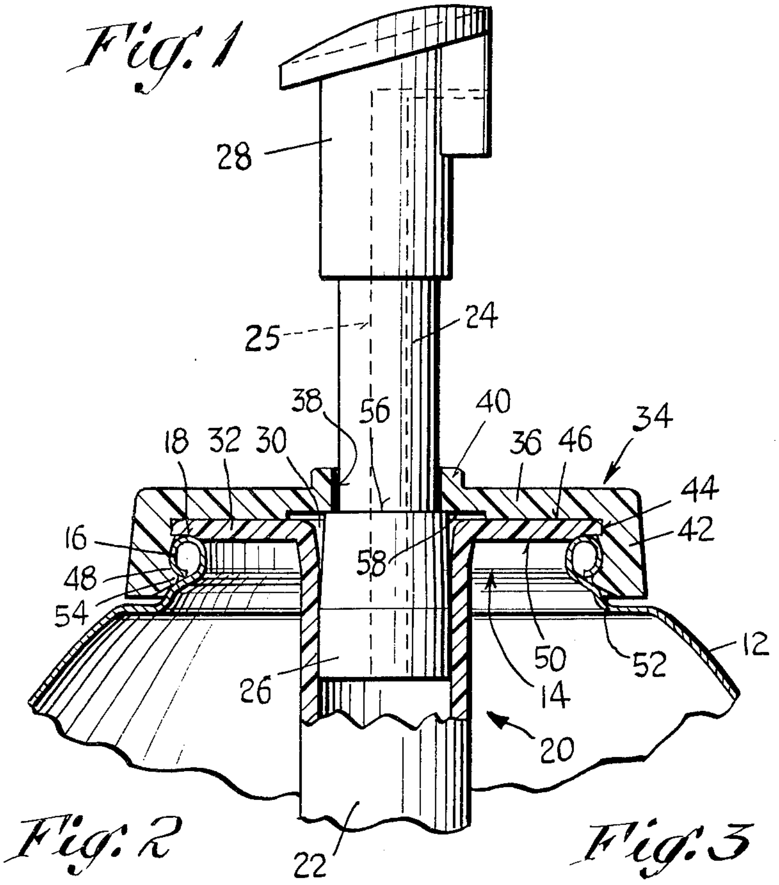
FIG. 1 is a fragmentary view, partly in side elevation and partly in axial section, of a hand-held dispenser construction of the pump-type, utilizing the present invention.
Figure 2:
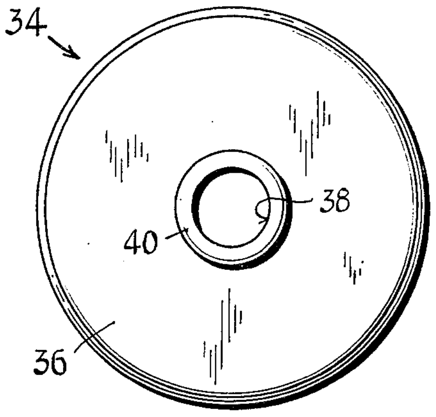
FIG. 2 is a top plan view of the snap-type plastic closure employed with the construction of FIG. 1.
Figure 3:
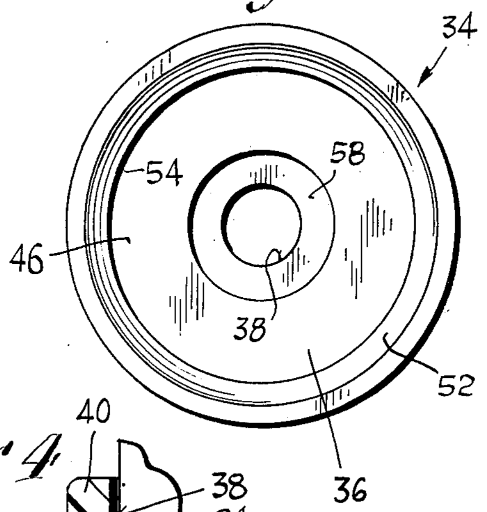
FIG. 3 is a bottom plan view of the snap-on plastic closure.
Figure 4:
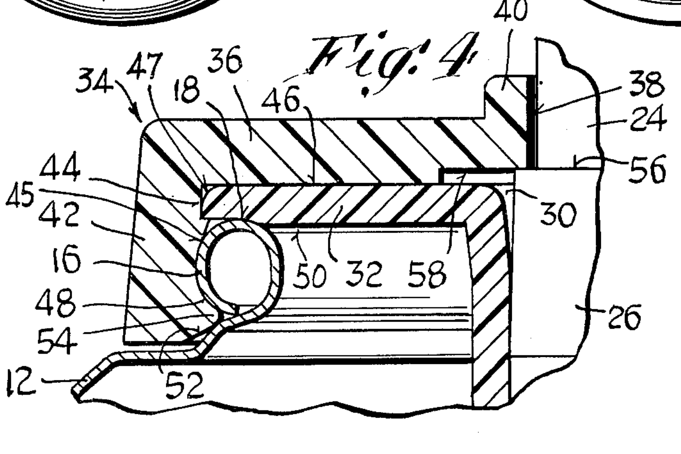
FIG. 4 is an enlarged fragmentary view of the dispenser construction of FIG. 1.

As shown, the present improved pump-type dispenser construction comprises an aerosol-type can including a crowned top portion 12 surrounding a top opening 14. The top portion 12 has an out-turned curl 16 forming an annular rounded bead 18 which constitutes the top rim of the can. Disposed in the top opening 14 is a pump assemblage designated generally by the numeral 20, such assemblage comprising a pump cylinder 22 and a cooperable hollow plunger 24 carried thereby, said plunger including a piston 26 of usual construction, and having a central passage indicated at 25.

Mounted on the upper extremity of the plunger 24 is an orificed depress button 28, also of usual construction.

The pump cylinder 22, plunger 24 and button 28 are all preferably molded of suitable plastic substance, and the cylinder 22 has at its mouth 30 an annular, outwardly-extending, flat mounting flange 32. The pump cylinder 22 can have the usual dip tube (not shown) which extends to the bottom of the container or can, all as is well understood.

In accordance with the present invention there is provided a unique snap-on plastic closure in the form of an inverted, dish-shaped member 34 having a disk-like body 36 provided with a central opening 38 through which the plunger 24 of the pump assemblage extends and in which it is reciprocatable. The body 36 has an upstanding annular flange or collar 40 defining the opening 38 and providing a large bearing surface for the plunger or shank 24.

The collar 40 reinforces and strengthens the body 36, which is important since the body constitutes a stop for the plunger 24 as will be later brought out.

The closure member 34 includes a depending peripheral flange 42 which has an annular undercut 44 closely adjacent the disk-like body 36 and adapted to receive and hold captive by a snap-fit assembly the mounting flange 32 of the pump cylinder 22. In accomplishing the assembly of the pump cylinder to the dish-shaped member, the inner wall portion of the peripheral flange 42 has a substantially conical, annular camming face 45 immediately adjacent the undercut 44, the face 45 camming outwardly the peripheral flange 42 when the mounting flange 32 is snapped into the dishshaped member. In addition, there is provided on the periphery of the mounting flange 32 a cooperable annular camming face 47 of rounded configuration, adapted to engage and snap past the camming face 45 during assembly. by such an arrangement, the parts can be snapped together with a minimum of time and effort. The sharp nature of the undercut 44 insures that the two parts will not become separated following the snap operation. Preferably, as shown, the mounting flange 32 is positioned in the undercut 44 so as to be engaged by major portions or areas of side 46 of the disk-like body 36. For maximum strength and ruggedness, I have found that the diameters of the pump mounting flange 32 and disk-shaped member 36 are preferably on the order of three times the diameter of the pump cylinder 22.

The peripheral flange 42 also has in its inside wall a shallow annular groove 48 which is adapted to receive the out-turned curl 16 of the can when the closure 34 is snapped over the top opening 14 thereof. The bead 18 formed by the curl 16 engages the underside 50 of the mounting flange 32 of the pump cylinder, and thereby supplements the holding action of the undercut 44 on the mounting flange 32. The dimensions of the various parts are so proportioned that the plastic closure 34 permanently, forcibly engages the curl 16 after its assemblage thereto. The depending flange 42 of the closure has a sloped annular surface 52 at its bottom rim portion, which provides a mouth or entrance for the curl 16, camming outward and expanding radially and circumferentially the flange during the snap-on assembly operation. The flange 42 has in its inner wall an annular rib or bead 54 providing the sloping mouth surface 52. Such bead snaps under the curl 16 during the assembly operation, with the result that the closure 34 is securely retained on the can 10 and normally resists all stresses which might be exerted against it, tending to remove it from the can. The rib 54 also holds the bead 18 of the can tightly against the underside 50 of the pump mounting flange 32, whereby there is eliminated all looseness and tendency for leakage of liquid at the curl and bead. Additionally, the rib 54 has a special strengthening effect on the bottom rim, which minimizes the likelihood of cracking or splitting, either during assembly or else later, during shelf life.

The natural tendency for the plastic substance of which the closure 34 is molded, to shrink or reduce its dimensions results in the closure being held securely on the can, and in all leakage being prevented at the joint formed with the bead 18.

It will be readily observed that the closure 34 has relatively thin wall sections which permit more rapid curing time during the molding process and provide for desirable uniformity in the molded product, as regards stability and dimensions. The depending flange 42 is made thicker at its bottom rim or edge, to increase its strength and reduce the likelihood of breakage.

The closure 34 is assembled to the pump 20 prior to the attachment of the button 28 to the plunger 24. The shank of the plunger is passed through the opening 38 of the closure 34 and the mounting flange 32 of the pump cylinder 22 forcibly pressfitted into the closure. Thereafter the button 28 can be applied to the plunger 24. The can or container 12 is filled with the liquid product to be dispensed, after which the assembly of pump and closure is applied to the can by snapping the closure onto the curl and bead 16, 18 of the can. The above assembly operations are carried out quickly and without difficulty, and help to reduce the cost of the dispenser while at the same time resulting in a quality product having an attractive appearance.

The plunger 24 is provided with a stop shoulder 56 which is engageable with the undersurface 58 of the closure 34 to limit the outward travel of the plunger. The collar 40 of the closure provides a desirable reinforcement, in connection with this stop function.

Figure 5:
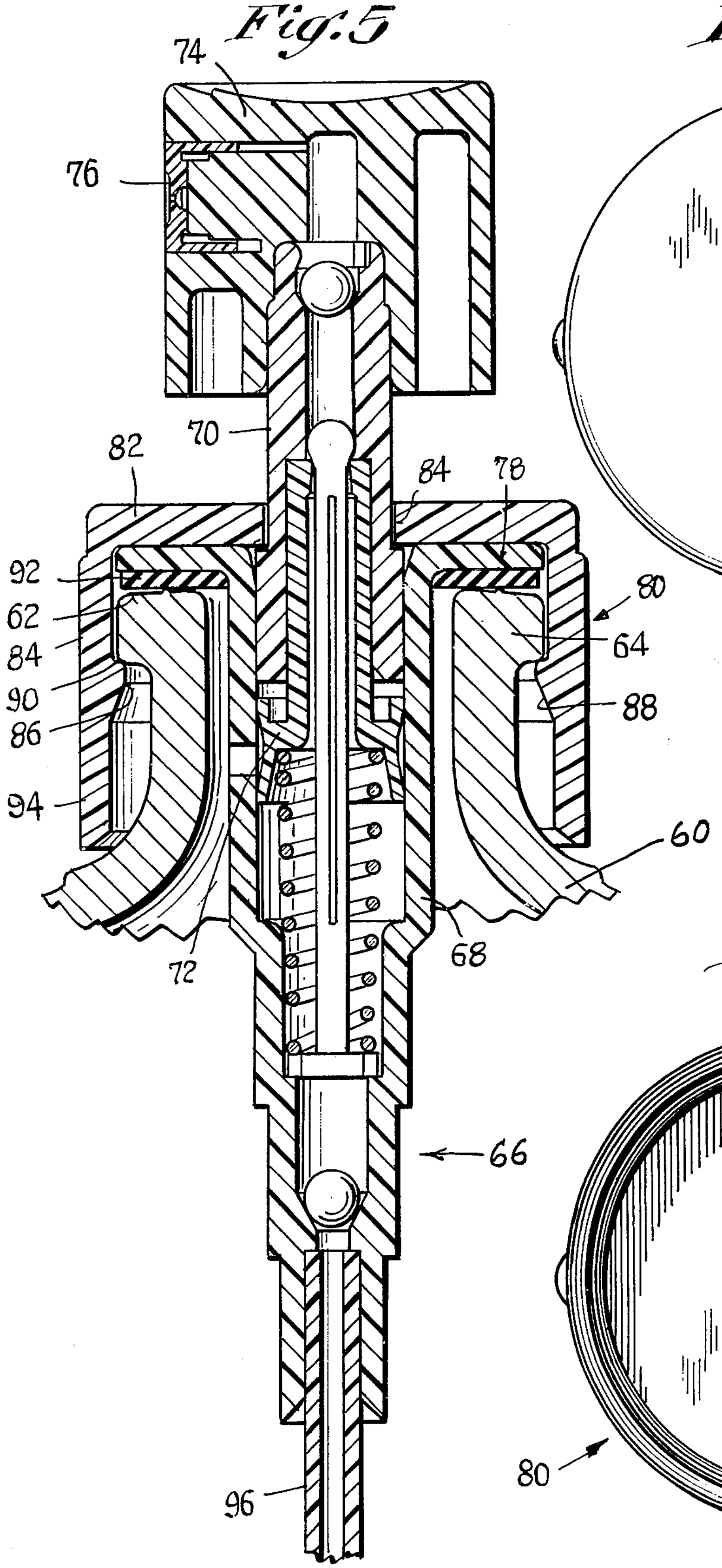
FIG. 5 is a fragmentary view, partly in side elevation and partly in axial section, of a modified hand-held dispenser costruction of the pump-type, constituting another embodiment of the invention.
Figure 6:
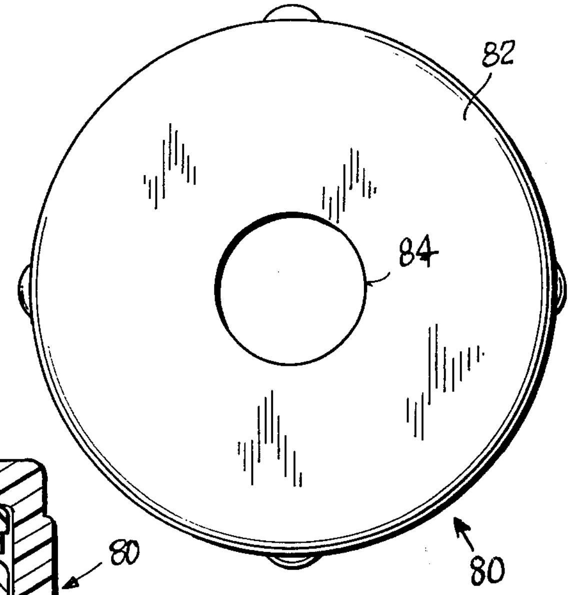
FIG. 6 is a top plan view of the snap-type plastic closure employed with the construction of FIG. 5.
Figure 7:
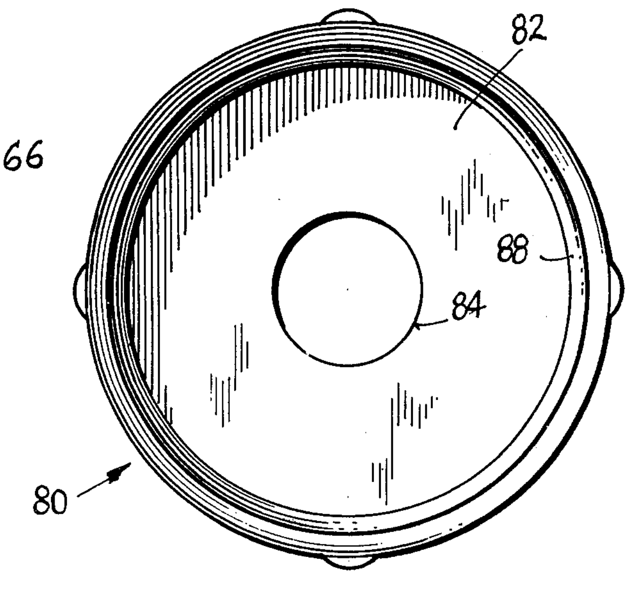
FIG. 7 is a bottom plan view of the snap-type plastic closure of FIG. 6.

Another embodiment of the invention is shown in FIGS. 5–7. FIG. 5 illustrates a container, generally designated by the numeral 60, which may be a molded glass bottle, having an open top with a circular rim 62 and an external annular bead or shoulder 64 extending around the rim. Carried in the container is a pump assemblage, generally designated by the numeral 66, comprising a pump cylinder 68, a plunger 70 and piston 72. The plunger 70 carries a depress button 74 of usual construction, with a discharge aperture 76.

Referring again to FIG. 5, the pump cylinder 68 comprises an annular mounting flange 78, which is substantially flat and extends outwardly from the cylinder. By the present invention there is provided a novel snap-on plastic closure for retaining the pump assemblage 66 in the container 60. The closure, designated 80, comprises an inverted, dish-shaped member particularly illustrated in FIGS. 6 and 7. The member has disk-like body 82 with a central opening 84 adapted to receive the plunger 70 of the pump assemblage 66, and is provided with a special, elongate peripheral flange 84. Disposed on the inner wall of the flange 84 is an internal, annular detent bead 86, having a substantially concial camming surface 88 at its underside, and a rounded, more sharply defined annular surface 90 at its uppermost portion. As shown, the mounting flange 78 of the pump assemblage 66 is adapted to be engaged by the underside of the disk-like body 82 of the member 80. A resilient sealing gasket 92 of annular configuration is disposed between the rim 62 of the container 60 and the mounting flange 78, such that a tight, waterproof seal is realized between the two parts.

During assembly, the resilient sealing gasket 92 is first assembled onto the pump assemblage 66 so as to engage the mounting flange 78, after which the assemblage is inserted into the container 60. The dish-shaped member 80 is then slipped over the plunger 70, and the detent bead 86 forced past the external annular bead 64 on the glass bottle. The camming surface 88 facilitates the bypass of the two beads. After the member 80 is in place, the depress button 74 is merely pressed onto the plunger 70.

By the present invention, the peripheral flange 84 on the member 80 extends downward from the disk-like body 82 a distance at least twice the spacing between the body and the annular detent bead 86. I have found that such a construction is highly desirable in that it greatly minimizes the tendency for the flange 84 to crack, either during or else after forced assembly of the member onto the glass bottle. It will be appreciated that during the bypass of the beads 86 and 64, substantial flexing or stretching of the member 80 occurs, particularly in the vicinity of the bead 86.

I have found that in such event the lower portion 94 of the flange 84 serves as a reinforcement and effectively prevents vertical cracks in the peripheral flange due to the stresses imposed by the assembly procedure. Such would clearly not be the case if the peripheral flange 84 were considerably shorter and had no special alternative reinforcement, as in the case where it would terminate in a thin rim at a point immediately below the bead 86.

The pump assemblage 66 has a suitable dip tube 96 which extends to the bottom of the container in the conventional manner. The pump construction can be similar to that illustrated and described in U.S. Pat. No. 3,159,316, dated Dec. 1, 1964 in the names of Wolf Steiman and William R. O'Donnell. Accordingly, further details of this construction need not be repeated here.

From the above it can be seen that I have provided a novel and improved hand-held dispenser pump construction which is both simple in its structure, inexpensive to manufacture and produce, and which requires a minimum of assembly time, the latter comprising at most, several simple steps which can be accomplished with a minimum of effort. In addition, no complex assembly machinery is required. Due to the special construction of the snap-closure, the tendency for breakage or malfunction is greatly minimized. The device thus represents a distinct advance and improvement in the technology of hand-held dispensers.

Variations and modifications are possible without departing from the spirit of the invention.

I claim:

1. In a hand-held dispenser pump device including a container having an open top comprising a circular rim surrounding an opening, said rim having an annular shoulder extending around its exterior, a pump cylinder and a protruding plunger carried thereby, said cylinder at its mouth having an annular, outwardly extending mounting flange supported adjacent its periphery on the top of said rim, the improvement comprising:

a. a one-piece, snap-on plastic closure comprising an inverted, dish-shaped member having a flat disk-like body provided with a central opening through which the plunger extends and in which it is reciprocatable, said mounting flange being disposed against and engaged by the underside of the disk-like body;

b. said member including a depending peripheral flange provided with an internal, annular detent bead adapted to engage the underside of said shoulder of the container rim; and c. said flange having a height equal to at least twice the spacing between the body and the annular detent bead, whereby the lower portion of the flange serves as a reinforcement to prevent vertical cracks in the flange when the detent bead is pried downward past the annular shoulder on the container.

* * * * *